June 15, 1943.　　　　E. E. HEWITT　　　　2,322,022
CONTROL DEVICE
Filed June 28, 1941　　　　2 Sheets-Sheet 2
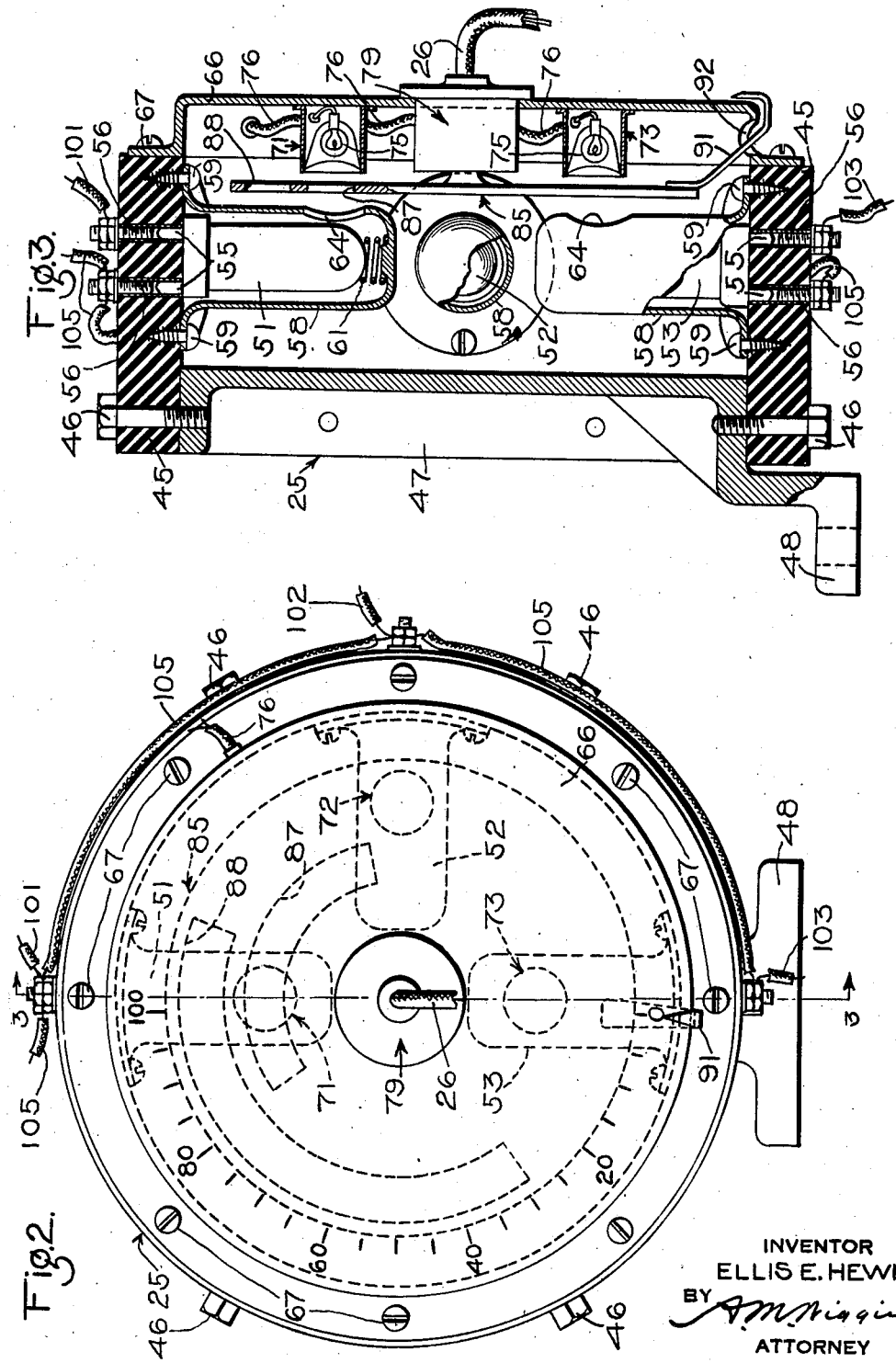
INVENTOR
ELLIS E. HEWITT
BY
ATTORNEY Patented June 15, 1943

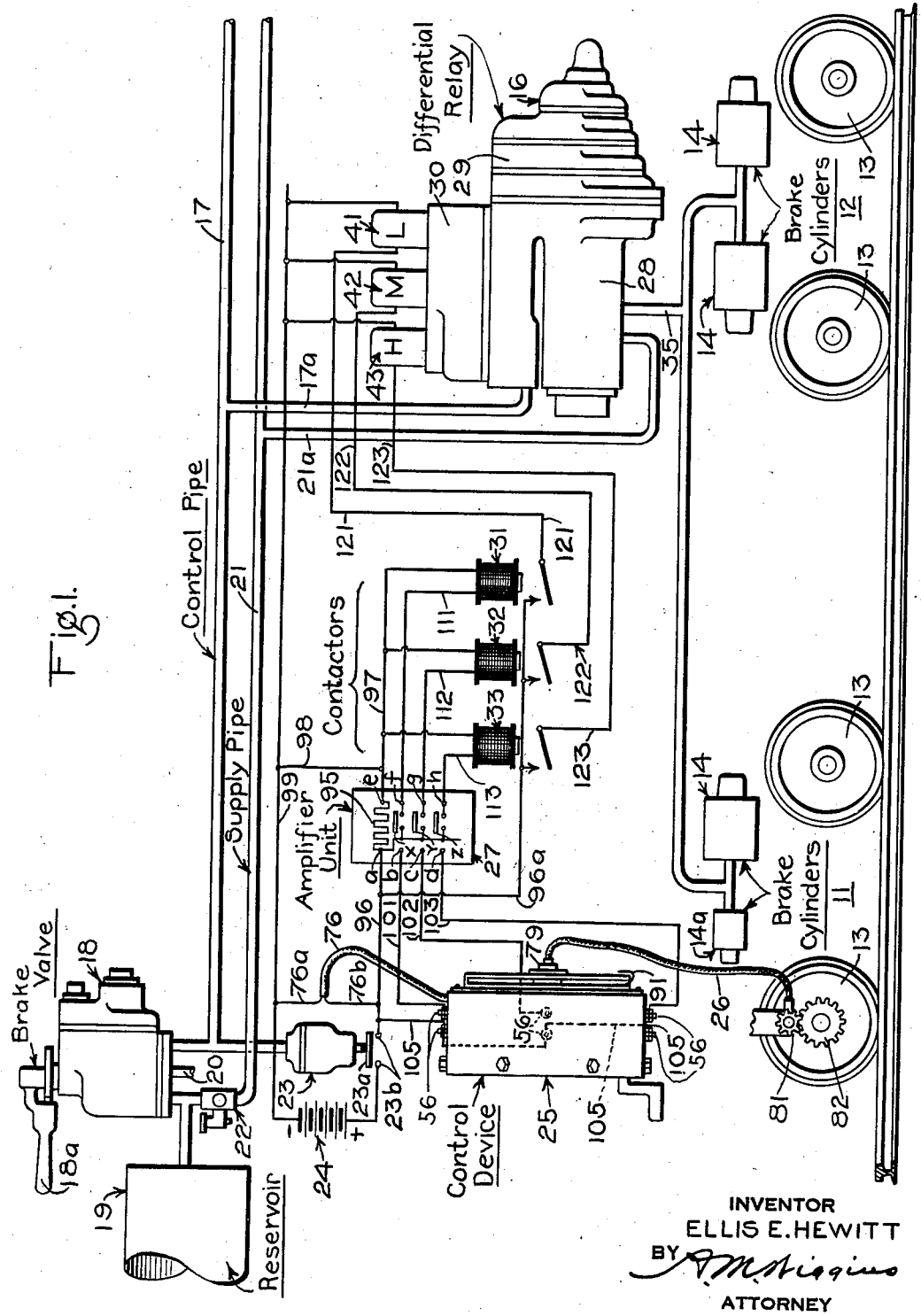

2,322,022

UNITED STATES PATENT OFFICE 2,322,022

CONTROL DEVICE

Ellis E. Hewitt, Edgewood, Pa., assignor to The Westinghouse Air Brake Company, Wilmerding, Pa., a corporation of Pennsylvania Application June 28, 1941, Serial No. 400,156

6 Claims. (Cl. 250—41.5)

This invention relates to control devices employing light-sensitive devices and adapted particularly for use in speed-controlled fluid pressure brake systems for railway cars and trains of the type described in my prior Patent 2,140,624.

In Patent 2,140,624 there is disclosed a fluid pressure brake system for railway cars or trains wherein a centrifuge type speed governor, driven according to the rotational speed of a wheel unit, is effective to control the degree of application of the brakes automatically in accordance with the speed of the car or train.

It is an object of my present invention to provide a novel type of control device, employing light-sensitive devices, for the purpose of controlling the degree of application of the brakes in accordance with the speed of the car or train.

More specifically, it is an object of my invention to provide a control device having a plurality of light-sensitive cells or tubes and an element positioned in accordance with the speed of the car or train for controlling the impingement of light beams on the cells in a desired combination or sequence.

The above objects and other objects of my invention which will be made apparent hereinafter, are attained by an illustrative embodiment thereof subsequently to be described and shown in the accompanying drawings, wherein Fig. 1 is a simplified diagrammatic view, showing a fluid pressure brake equipment for a railway car and embodying my invention.

Fig. 2 is an enlarged front view of the control device which is a part of my present invention, and Fig. 3 is a vertical sectional view, taken on the line 3—3 of Fig. 2, showing further details of construction and the arrangement of parts in the control device.

Description

For the purpose of describing the manner in which the control device comprising my present invention may be employed I have shown it in connection with a fluid pressure brake system for railway cars. It should be understood, however, that the control device comprising my invention is capable of other uses and other applications.

Referring to Fig. 1, the fluid pressure brake system is shown in simplified form and comprises the essential elements for a single car having two wheel trucks 11 and 12 located in conventional manner at opposite ends of the car. It will be understood that each of the wheel trucks is provided with two wheel-and-axle units or assemblies severally comprising a pair of wheels fixed at opposite ends of a connecting axle and rolling on opposite rails of a track. In the drawings, only one wheel of each wheel unit is shown.

Any suitable type of brakes, such as the clasp shoe type engaging the rim of the wheels, may be employed although for purposes of simplicity the brake elements and brake operating levers are omitted from the drawings. The brakes are applied and released in response to the supply and the release of fluid under pressure from a plurality of brake cylinders 14 of a given diameter and a brake cylinder 14a of small diameter associated with one of the wheel units on wheel truck 11. Although any number of brake cylinders may be provided for trucks, two brake cylinders are shown for each truck, each cylinder being adapted to operate the brakes of a corresponding wheel-and-axle unit.

The purpose of providing the smaller brake cylinder 14a is to cause less braking power to be exerted on the corresponding wheel unit so that this wheel unit will never slip or slide, thus assuring the rotation of the wheels of this wheel unit at all times at a speed corresponding to car speed.

Fluid under pressure is supplied to and released from the brake cylinders 14 and 14a under the control of a differential relay 16 which is, in turn, operatively responsive to and controlled by the pressure in a pipe 17, hereinafter designated the control pipe.

The pressure of the fluid in the control pipe is subject to the control of the operator of the car or train in any desired manner, being illustrated as effected through the medium of a manually operated self-lapping brake valve 18.

A reservoir 19 is provided which is suitably charged to a desired pressure, such as one hundred pounds per square inch, by a fluid compressor not shown. The control pipe 17 is charged with fluid supplied from the reservoir 19 under the control of the brake valve 18.

There is also provided a so-called supply pipe 21 which is charged constantly with fluid at a reduced pressure such as ninety pounds per square inch, from the reservoir 19 through a standard feed valve device 22. The differential relay 16 is operated in response to the fluid pressure in the control pipe 17 to supply fluid under pressure from the supply pipe 21 to the brake cylinders 14 and 14a.

A switch device 23, hereafter referred to as the pressure operated switch, is connected to the control pipe 17 and is operatively responsive to variations of the pressure therein.

According to my invention, I further provide a control device 25 hereinafter described in detail which is associated through a flexible shaft 26 with the wheel unit, hereafter referred to as the underbraked wheel unit, on which the brakes are applied by the smaller brake cylinder 14a.

The control device 25 is effective through the medium of an amplifier unit 27 and a plurality of contactors 31, 32 and 33 to control three conditioning magnet valves 41, 42 and 43 of the differential relay 16.

Considering the parts of the equipment in greater detail, the differential relay 16 is of the type described and claimed in my prior Patent 2,140,624. In view of the complete description of this type of device given in my prior patent, it is believed unnecessary to show details of construction and, therefore, the differential relay 16 will be described only briefly herein.

The differential relay 16 comprises a relay valve portion 28, a diaphragm portion 29 and a magnet valve portion 30.

The relay valve portion 28 comprises a suitable supply valve and a release valve respectively controlling communication between a branch pipe 21a of the supply pipe and a pipe 35 having two branches leading to the brake cylinders of the two wheel trucks, and communication from the brake cylinder pipe 35 to an atmospheric exhaust port not shown.

The diaphragm portion 29 comprises a plurality of flexible diaphragms of successively different effective pressure areas arranged in coaxial relation in a manner to effect operation of the relay valve portion 28 in response to the fluid pressure acting on one or more of the diaphragms selectively. The largest of the diaphragms is subject on one side to the pressure in the brake cylinders and is effective to cause self-lapping of the relay valve portion when the brake cylinder pressure exerts a force corresponding to that exerted by the fluid pressure acting in the opposite direction on one or more of the diaphragms. Formed between the successive pairs of diaphragms are three chambers each of which is selectively chargeable with fluid under pressure from a branch pipe 17a of the control pipe 17 or vented to atmosphere under the control of a particular one of the magnet valves 41, 42 or 43 corresponding thereto. The chamber formed on the outside face of the smallest diaphragm is constantly in communication with the branch pipe 17a and is therefore constantly charged to the pressure in the control pipe.

The magnet valves 41, 42 and 43 are effective when energized and deenergized in different combinations to charge or vent the diaphragm chambers correspondingly to cause the relay valve portion 28 to supply fluid to the brake cylinders at corresponding different pressures in response to a given control pipe pressure.

Without analyzing in detail the character of the operation, it will be assumed for purposes of the present application that when the magnet winding of only the magnet valve 41, hereinafter referred to as the low magnet valve and further identified by the letter L, is energized, the differential relay 16 operates to supply fluid at a pressure which is 40% of that established in the control pipe 17.

When the magnet windings of all of the magnet valves 41, 42 and 43 are deenergized, the differential relay 16 operates to supply fluid at a pressure which is 60% of that established in the control pipe 17.

When the magnet winding of only the magnet valve 42, hereinafter referred to as the medium magnet valve and further identified by the letter M, is energized, the differential relay 16 operates to supply fluid to the brake cylinders at a pressure which is 80% of that established in the control pipe 17.

When the magnet winding of the magnet valve 42 and also that of the magnet valve 43, hereinafter referred to as the high magnet valve and further identified by the letter H, are both energized while the magnet winding of the low magnet valve 41 is deenergized, the differential relay 16 operates to supply fluid to the brake cylinders at a pressure which is substantially equal to or 100% of the pressure established in the control pipe 17.

The self-lapping brake valve 18 is of the well-known type described and claimed in Patent No. 2,042,112 to E. K. Lynn and Rankin J. Bush. Since reference may be had to this patent, the brake valve 18 will be only functionally described herein.

When the operating handle 18a of the brake valve 18 is in its normal or brake release position, fluid under pressure is exhausted from the control pipe 17 through an exhaust port and pipe 20 at the brake valve. Thus the control pipe 17 is normally at atmospheric pressure when the brakes are released.

Upon the displacement of the brake valve handle 18a in a horizontal plane out of its brake release position, the valve mechanism of the brake valve is operative to establish communication through which fluid under pressure is supplied from the reservoir 19 to the control pipe 17. The valve mechanism is automatically self-lapping to limit the pressure established in the control pipe to a value substantially proportional to the displacement of the brake valve handle out of its brake release position. Thus the control pipe 17 is chargeable to different fluid pressures varying in degree according to the displacement of the brake valve handle out of its brake release position.

If the pressure in the control pipe 17 tends to reduce for some reason, such as leakage, the valve mechanism in the brake valve is automatically operative to supply fluid under pressure to maintain a pressure in the control pipe corresponding to the position of the brake valve handle. This pressure-maintaining feature will be referred to hereinafter in connection with an assumed operation of the equipment.

The pressure operated switch 23 may be and preferably is of the snap-acting type described in my prior Patent 2,096,492. As diagrammatically shown, the switch 23 comprises a movable contact 23a which is actuated into and out of engagement with a pair of associated fixed insulated contacts 23b in response to the variation of the pressure in the control pipe 17 from below to above or vice versa with respect to a certain critical pressure. Thus, for example, when the pressure in the control pipe exceeds five pounds per square inch, the contact 23a is snapped into contact with the associated pair of contacts 23b. Conversely, when the pressure in the control pipe reduces below five pounds per square inch, the contact 23a is snapped out of engagement with the associated pair of contacts 23b. The function of the pressure operated switch 23 will be explained hereinafter in detail. For present purposes it is sufficient to state that the pressure operated switch 23 serves to interrupt various control circuits, hereinafter to be described, whenever the brakes are released in response to the reduction in the pressure in the control pipe to atmospheric pressure.

Referring to Figs. 1, 2 and 3, the control device 25 comprises an annular casing 45 of suitable insulating material, such as Bakelite or hard rubber, secured by a plurality of screws 46 to a circular disk-like mounting plate 47 having a bracket or foot portion 48 whereby the device may be attached to the car body in a desired position.

The casing 45 is provided with a plurality of sockets, illustrated as three in number, opening to the interior of the casing and having inserted therein corresponding light-sensitive (photoelectric) cells or tubes 51, 52 and 53. These light-sensitive tubes are of the two-element type having two projecting prongs 55 adapted to be inserted in the receiving socket. Suitable terminal or binding posts are provided for each prong in each socket, the posts having suitable nuts on the exterior thereof for securing wires thereto externally of the casing.

In order to hold each of the light-sensitive tubes 51, 52 and 53 in their respective sockets and for another reason hereinafter explained, a surrounding tubular shield 58 of relatively thin opaque fibrous or other suitable material is provided, each shield 58 being substantially larger in diameter than the tube and being flared suitably at one end to provide a flange whereby it may be secured to the interior of the casing 45 as by screws 59. A coil spring 61 is preferably interposed between the end of the tube and the closed end of the shield.

Each of the shields has an opening, illustrated as a circular opening 64, through which a beam of light may pass to impinge upon the enclosed light-sensitive tube. Thus, because of the opacity of the shield, no light except that admitted directly through the opening 64 of the surrounding shield can cause an operative response of the tube.

As will be apparent in Fig. 2, the light-sensitive tubes 51, 52 and 53 project inwardly of the casing 45 in radial relation which they may have any desired angular relation with respect to each other, within the casing 45, I have for purposes of my present invention shown them as spaced apart at an angle of substantially 90°.

The open end of the casing 45 is closed by a cover 66 which may be secured to the casing 45 as by a plurality of screws 67. Suitably attached on the inner face of the cover 66 are three lamp devices 71, 72 and 73, one for each light-sensitive tube, respectively located in positions in registry with the opening 64 in the shield 58 enveloping the corresponding light-sensitive tube. The lamp device 72 is not visible in Fig. 3 but its position is indicated in Fig. 2. Each of the lamp devices 71, 72 and 73 provides a concentrated beam of light substantially of the diameter of the opening 64 in the shield 58. Current for energizing the lamp bulb 75 of each lamp device is supplied through a pair of wires carried in an insulated cable 76 that extends through a suitable insulated opening in the cover 66 to the exterior of the casing.

Suitably mounted at the central point of the cover 66 is a standard speedometer 79 having a driving connection to the underbraked wheel unit through the flexible shaft 26 previously mentioned. The flexible shaft 26 may be driven in accordance with the rotational speed of the underbraked wheel unit through any form of gear mechanism, such as a pinion 81 fixed to the end of the shaft and meshing with a gear wheel 82 rotatable with the wheel or axle of the unit, as indicated in Fig. 1.

Instead of the more usual indicating needle or pointer, the speedometer 79 is adapted to rotarily shift a disk shutter 85, to different positions in accordance with the rotational speed of the underbraked wheel unit. The reason for providing an underbraked wheel unit will thus be apparent because it is desirable that the disk shutter always occupy a position corresponding to the actual speed of the car or train.

The disk shutter 85 rotates in a plane interposed between the lamp devices 71, 72 and 73 and the light-sensitive cells 51, 52 and 53 and is provided with two arcuate openings or slots 87 and 88 whereby to permit a beam of light from one or more of lamp devices to pass through the disk shutter and impinge upon the corresponding light sensitive cells in the manner presently to be described.

The disk shutter 85 has secured thereto a suitably formed finger element 91 which extends through a peripherally extending slot 92 in the cover 66 and curves radially inwardly to serve as a pointer in connection with a scale formed on or attached to the exterior face of the cover 66 indicating actual linear speed in terms of miles per hour. As will be seen in Fig. 2, the finger element 91 is in registry with the zero mark and moves over a scale having graduations up to 100, the point on the scale corresponding to one hundred miles per hour being substantially diametrically opposite the zero point. Obviously, the scale may be extended above one hundred miles if desired. The slot 92 in the cover 66 of course extends correspondingly as seen in Fig. 1 to permit the movement of the finger element 91.

As will be apparent from Fig. 2, the arcuate slot 87 in the disk shutter 85 is of such length and is so positioned radially that, with the disk shutter in a position corresponding to zero speed as shown in Fig. 2, the light beam from the lamp device 71 passes through the slot 87 and the opening 64 in the shield 58 and impinges upon the light-sensitive elements of the tube 51 to cause an operative response thereof.

The disk shutter 85 shifts rotatively in a clockwise direction, as seen in Fig. 2, with increasing speed. When the shutter has shifted to the position corresponding substantially to twenty miles per hour, the slot 87 passes from in front of the opening 64 in the shield 58 associated with the light-sensitive tube 51, thereby causing the beam of light to be cut off from the light-sensitive tube 51 by the non-perforate position of the shutter.

When the disk shutter has shifted rotatively to a position corresponding substantially to forty miles per hour, the right-hand end of the slot 88 registers with the opening 64 in the shield 58 associated with the light-sensitive tube 52, thereby permitting the beam of light from the corresponding lamp device 72 to pass through and impinge upon the light-sensitive elements of the tube 52.

It will be observed that while the disk shutter is rotating to its position corresponding to forty miles per hour, the slot 87 does not pass in front of the opening 64 in the shield 58 associated with the light-sensitive tube 52 but is so radially displaced inwardly as to prevent the passage of a beam of light except in response to the interposition of the slot 88.

The slot 88 is of sufficient length that thereafter as the disk shutter is displaced rotatively in a clockwise direction with increasing speed up to the maximum speed, the slot permits the passage of a beam of light from the lamp device 72 to the corresponding light sensitive tube 52.

When the disk shutter is displaced to a position corresponding to sixty-five miles per hour, the advance end of the slot 87 is interposed between the lamp device 73 and the opening 64 in the shield 58 associated with the light-sensitive tube 53, thereby permitting the passage of the beam of light to cause an operative response of the tube 53. The slot 87 is of sufficient length that as the displacement of the disk shutter continues in correspondence with the increase in speed above sixty-five miles per hour, the slot continues to permit the passage of the beam of light from the lamp device 73 so as to impinge upon the corresponding light-sensitive tube 53.

Upon a reduction in speed and the corresponding counterclockwise movement of the disk shutter 85, the light beam from the lamp device 73 is cut off from the tube 53 whenever the speed diminishes below sixty miles per hour. Thereafter, as the disk shutter continues to be restored in a counterclockwise direction, the light beam from the lamp device 72 is cut off from the associated light-sensitive tube 52 when the speed reduces below a speed of forty miles per hour. Thereafter, whenever the speed reduces below twenty miles per hour, the left-hand end of the slot 87 again passes between the lamp device 71 and the opening 64 in the shield 58 associated with the light-sensitive tube 51, thereby permitting the passage of the beam of light to the tube.

As is well known, it is a characteristic of light-sensitive cells or tubes of the type shown that only when a beam of light is impinged on the light-sensitive elements of the tubes is a small current set up in a circuit connected to the tube. This current is of the order of micro-amperes and it is therefore, necessary to provide suitable amplification in order to render the response of the light-sensitive tubes operatively effective.

The amplification unit 27, of conventional character and construction, is accordingly provided whereby to render each of the light-sensitive tubes 51, 52 and 53 effective to control the operation of the contactors 31, 32 and 33 respectively. Since the apparatus contained in the amplifier unit is conventional, it is believed unnecessary to specifically describe or show the details thereof. Briefly, however, the amplifier unit 27 includes a suitable three-electrode amplifier tube for each of the light-sensitive tubes 51, 52 and 53, the grid bias of which is controlled in usual manner in accordance with the response of the light-sensitive cells to the impingement or lack of impingement of the light beams on the tubes. Each amplifier tube is adapted to control a suitable relay in the plate circuit thereof, which relay in turn controls the circuit for energizing the winding of the corresponding one of the contactors 31, 32 and 33.

The amplifier unit 27 is provided with eight terminal posts designated a, b, c, d, e, f, g and h, respectively, to which external wiring connections are made as hereinafter described.

Contained within the amplifier unit is a resistor 95 which is connected between the terminals a and e. A suitable external source of direct-current voltage such as a storage battery 24 is provided, the voltage of which is impressed across the terminals a and e of the amplifier unit under the control of the pressure operated switch 23. To this end, the contacts of the pressure switch 23 are interposed in a wire 96 connecting one terminal of the battery 24, hereinafter referred to as the positive terminal, to the terminal a of the amplifier unit 27. The terminal e of the amplifier unit is connected by a wire 97 and a branch wire 98 to a wire 99, hereinafter referred to as the negative battery wire, which is connected to the negative terminal of the battery 24.

The resistor 95 serves as a source of potential within the amplifier unit and has various top connections (not shown) to provide the desired voltages for the operation of the three-electrode amplifier tubes.

The terminal posts b, c, and d of the amplifier unit 27 are connected by wires 101, 102 and 103 to one corresponding terminal post 56 of the control device 25 for the light-sensitive tubes 51, 52 and 53 respectively. The remaining ones of each pair of terminal posts of the control device for the light-sensitive tubes 51, 52 and 53 are connected by a common wire 105 to the wire 96 at a point between the contacts of the pressure operated switch 23 and the terminal post a of the amplifier unit 27. If desired, the wire 105 may be connected directly to the terminal post a of the amplifier unit for convenience of connection.

Although not shown, it will be understood that suitable connections are made within the amplifier unit from the terminal posts b, c and d whereby a suitable portion of the voltage-drop across the resistor 95 is impressed across the terminal posts of each of the light-sensitive tubes 51, 52 and 53 and whereby the tubes are rendered effective to vary the grid bias of the amplifier tubes contained within the amplifier unit 27.

One corresponding terminal of the magnet windings of each of the contactors 31, 32 and 33 is connected by a corresponding wire 111, 112 or 113 to the corresponding terminal post f, g or h of the amplifier unit. The opposite terminals of the magnet windings of the contactors are all connected to the wire 97 and thence by the wire 98 to the negative battery wire 99.

As previously stated, the circuit for energizing the magnet windings of the contactors 31, 32 and 33 are controlled respectively by relays within the amplifier unit. For simplicity, the contacts of the relays referred to are diagrammatically indicated and designated by the reference numerals x, y and z respectively. These contacts are shown in their normally open position. It will be understood, however, that they are operated to their respective closed positions in response to the impingement of a light beam on the corresponding light-sensitive tube. Thus, contact x is actuated to its closed position only in response to the impingement of the light beam from lamp device 71 on the light-sensitive tube 51. The contact y is actuated to its closed position only when the light beam from lamp device 72 impinges on the light-sensitive tube 52. The contact z is actuated to its closed position only when the light beam from lamp device 73 impinges on the light-sensitive tube 53.

The relay contacts x, y and z serve to connect the terminals *f*, *g* and *h* respectively to the terminal *a* in the amplifier unit, when operated to their respective closed positions. If the contacts of the pressure operated switch 23 are closed, it will be seen that the closure of any of the contacts *x*, *y* and *z* establishes a circuit for energizing the magnet winding of the corresponding contactors 31, 32 or 33.

Each of the contactors 31, 32 and 33 is provided with a single front contact, that is a contact which is in its dropped-out or open position when the magnet winding of contactor is deenergized and which is actuated to its picked-up or closed position when the magnet winding of the contactor is energized.

The contact of the contactor 31 is effective when in its picked-up position to connect a branch wire 96a, joined to the wire 96 at a point between the contacts of pressure switch 23 and the terminal post *a* of the amplifier unit 27, to a wire 121 connected to one terminal of the magnet winding of the low magnet valve 41. The contact of the contactor 32 is effective when in its closed position to connect the wire 96a to a wire 122 which is connected to the corresponding terminal of the magnet winding of the medium magnet valve 42. In a similar manner, the contact of the contactor 33 is effective when in its picked-up position to establish a connection between the wire 96a and a wire 123 which is in turn connected to one terminal of the magnet winding of the high magnet valve 33. The opposite terminals of the magnet windings of all of the magnet valves 41, 42 and 43 are connected to the negative battery wire 99.

It will thus be seen that, with the contacts of the pressure operated switch 23 closed, the magnet winding of each of the magnet valves 41, 42 and 43 of the differential relay 16 is not energized unless the corresponding contactor 31, 32 and 33 is actuated to its picked-up position.

As previously indicated, the lamp devices 71, 72 and 73 are illuminated by electric current supplied through a two-wire cable 76. As will be seen in Fig. 1, the two wires 76a and 76b in the cable are connected across the battery wires 96 and 99, subject to the control of the pressure operated switch 23. Thus when the pressure operated switch is opened, the lamp devices are dark; and when the pressure operated switch is closed, the lamp devices are automatically illuminated.

*Operation*

Let it be assumed that a car having the brake control equipment shown in Fig. 1 is being driven under power at a speed of seventy miles per hour. In such case, the brake valve handle 18a will be in its normal brake release position and fluid under pressure correspondingly exhausted from the brake cylinders 14 and 14a so that the brakes on the car wheels are released.

Since the car is traveling at an assumed speed of seventy miles per hour, the disk shutter 85 of the control device 25 is correspondingly displaced from the position shown in Fig. 2 in a clockwise direction to a position wherein the slot 88 is interposed between the lamp device 72 and the opening 64 in the shield 58 enveloping the light-sensitive tube 52 while, at the same time, the slot 87 is interposed between the lamp device 73 and the opening 64 in the shield 58 enveloping the light-sensitive tube 53. At the same time also a non-perforate portion of the disk shutter is interposed between the lamp device 71 and the opening 64 in the shield 58 enveloping the light-sensitive tube 51.

With the brakes released, the control pipe 17 is at atmospheric pressure and therefore the contacts of the pressure operated switch 23 are in open position. Consequently, no current is supplied to the bulbs 75 of the lamp devices and all of the lamp devices are accordingly dark.

For reasons which will be explained hereinafter, the contactors 31, 32 and 33 are correspondingly all deenergized at this time. Due to the open position of the contacts of the pressure operated switch 23 and the open position of the contacts of the contactors 31, 32 and 33, the circuits for energizing the magnet windings of the magnet valves 41, 42 and 43 of the differential relay 16 are interrupted and the magnet windings are therefore deenergized.

Let it now be further assumed that the operator desires to effect an application of the brakes to bring the car to a stop. In such case, he first shuts off the propulsion power and then shifts the brake valve handle 18a out of its brake release position into its application zone an amount corresponding to the desired degree of brake application. Let it be assumed that the operator shifts the brake valve handle 15a to a position such that the control pipe 17 is charged to a pressure of fifty pounds per square inch.

When the pressure in the control pipe 17 exceeds five pounds per square inch, the contacts of the pressure operated switch 23 are snapped to closed position. The closure of the contacts of the switch 23 automatically causes current to be supplied to the bulbs 75 of the lamp devices 71, 72 and 73 so that they accordingly project corresponding beams of light in a straight line therefrom.

Due to the fact that the car is traveling at a speed of seventy miles per hour and that the opening 64 in the shield 58 enveloping the light-sensitive tube 51 is blanked by the imperforate portion of the disk shutter 85 while the opening 64 in the shield 58 enveloping each of the light-sensitive tubes 52 and 53 is open to the beam of light from the corresponding lamp device 72 or 73 projected through the slots 88 and 87, the contactors 32 and 33 will be correspondingly energized and the contacts thereof actuated to their picked-up or closed positions and the contactor 31 will be deenergized and the contact thereof biased to its open position.

With the contacts of the pressure operated switch 23 closed and the contacts of the contactors 32 and 33 actuated to their closed positions, the magnet windings of both the medium and high magnet valves 42 and 43 will be energized. Due to the fact that the contact of the contactor 31 is in its open position, the magnet winding of the low magnet valve 41 is deenergized.

It will be recalled from the previous description of the differential relay 16 that with the magnet windings of the magnet valves 42 and 43 energized and that of the magnet valve 41 deenergized, the differential relay 16 operates to supply fluid at a pressure which is equal or substantially equal to that established in the control pipe 17. With a fluid pressure of fifty pounds per square inch established in the control pipe, as previously assumed, the differential relay 16 accordingly operates to supply fluid under pressure from the supply pipe 21 and the branch pipe 21a thereof to the brake cylinder pipe 35 and the connected brake cylinders 14 and 14a to establish a fluid pressure of fifty pounds per square inch therein. The brakes are accordingly applied on the car wheels 13 in accordance with the fluid pressure established in the brake cylinders.

As the speed of the car reduces in response to the brake application below sixty miles per hour, the disk shutter 85 shifts correspondingly in a counterclockwise direction to a position such that the slot 87 moves from between the lamp device 73 and the opening 64 in the shield 58 enveloping the light-sensitive tube 53, thereby cutting off the beam of light from the tube.

The circuit for energizing the magnet winding of the contactor 33 is accordingly interrupted due to the opening of the relay contact z within the amplifier unit 27 in response to the cutting off of the beam of light from the light-sensitive tube 53. The contact of the contactor 33 is accordingly restored to its open position thereby interrupting the circuit for energizing the magnet winding of the high magnet valve 43. The differential relay 16 is accordingly conditioned to effect a reduction of the pressure supplied thereby to the brake cylinders to a value which is 80% of that established in the control pipe. Such reduction of the pressure in the brake cylinders effected in response to the reduction in the speed of the car below sixty miles per hour does not take place instantaneously but at a controlled rate.

When the pressure in the brake cylinders is reduced, by operation of the differential relay 16, to a value which is 80% of that established in the control pipe 17, such pressure remains in the brake cylinders unchanged until the speed of the car further reduces below forty miles per hour. With fifty pounds per square inch fluid pressure in the control pipe, as assumed, the pressure established in the brake cylinders following a reduction in car speed below sixty miles per hour will be 80% of fifty pounds per square inch or forty pounds per square inch. The degree of application of the brakes associated with the car wheels is thus correspondingly reduced with the reduction in the speed of the car.

When the speed of the car reduces below forty miles per hour, the disk shutter 85 in the control device 25 is shifted sufficiently in a counterclockwise direction that the slot 88 passes from between the lamp device 72 and the opening 64 in the shield 58 enveloping the associated light-sensitive tube 52, thereby cutting off the beam of light from the tube. The relay contact y within the amplifier unit 27 is thus restored to its open position thereby interrupting the circuit for energizing the magnet winding of the contactor 32 and causing the contact of the contactor 32 to be restored to its open position. The restoration of the contact of contactor 32 to its open position effects the deenergization of the magnet winding of the medium magnet valve 42 of the differential relay 16.

As previously explained, with the magnet windings of all of the magnet valves 41, 42 and 43 deenergized, the differential relay 16 operates to effect a reduction of the pressure in the brake cylinders to a value which is 60% of that established in the control pipe 17. With fifty pounds per square inch fluid pressure established in the control pipe 17 as assumed, the differential relay 16 is accordingly operated in response to the reduction of car speed below forty miles per hour to effect a reduction of the pressure in the brake cylinders to a value which is 60% of fifty pounds per square inch or thirty pounds per square inch, the reduction being effected at a controlled rate as in the previous instance. After the pressure in the brake cylinders is reduced to 60% of that in the control pipe, the pressure in the brake cylinders remains unchanged, assuming no change in the pressure in the control pipe 17, until the speed of the car reduces below twenty miles per hour.

As will be apparent from Fig. 2, the counterclockwise rotation of the disk shutter 85 corresponding to reduction in car speed below forty miles per hour causes the slot 88 to pass between the lamp device 71 and the tube 51 but since the slot is displaced radially outward from the opening 64 in the shield enveloping the tube 51, the beam of light continues to be cut off from the tube 51 except as hereinafter described.

Upon the reduction of car speed below twenty miles per hour, the disk shutter 85 of the control device 25 is in such rotative position that slot 87 is interposed between the lamp device 71 and the opening 64 in the shield 58 associated with the light-sensitive tube 51 and continues to be so interposed thereafter with reducing car speed, finally attaining the position indicated in Fig. 2 when the car is completely stopped.

The light-sensitive tube 51 thus operates in response to the impingement thereon of the beam of light from the lamp device 71 to cause operation of the relay contact x in the amplifier unit 27 to its closed position, thereby effecting energization of the magnet winding of the contactor 31. The contact of the contactor 31 is thus actuated to its picked-up or closed position establishing the circuit for energizing the magnet winding of the low magnet valve 41.

As previously indicated, with only the magnet winding of the magnet valve 41 energized, the differential relay 16 is conditioned to cause fluid under pressure to be supplied to the brake cylinders at a value which is only 40% of that established in the control pipe 17. The differential relay thus effects a reduction of the pressure in the brake cylinders from thirty pounds per square inch to twenty pounds per square inch at a controlled rate. It will thus be seen that when the car speed reduces below twenty miles per hour, the degree of application of the brakes is correspondingly reduced in accordance with the reduction of the pressure in the brake cylinders.

When the car comes to a complete stop, the brakes remain applied to a degree corresponding to the pressure of the fluid remaining in the brake cylinders which as just indicated is 40% of that established in the control pipe. If the operator desires to increase the degree of application of the brakes after the car comes to a stop he may do so by further displacing the brake valve handle out of its normal brake release position to effect a corresponding increase of the pressure in the control pipe. Thus, if the operator causes the pressure in the control pipe to be increased to seventy pounds per square inch, the differential relay 16 will operate to cause fluid at a pressure of twenty-eight pounds per square inch to be supplied to the brake cylinders to correspondingly increase the degree of application of the brakes.

It will be apparent that the operator may graduate the application of the brakes, either increasing or decreasing the degree, as the car comes to a stop. For simplicity, it was previously assumed that the pressure in the control pipe was unchanged while the car was being brought to a stop but, obviously, if the pressure in the control pipe 17 is changed during an application of the brakes, the actual pressure in the brake cylinders is adjusted accordingly by operation of the differential relay, although the ratio of the pressure in the brake cylinders to that in the control pipe for a particular speed range always remains the same. The automatic reduction in the degree of brake application with reducing car speed should make it ordinarily unnecessary for the operator to alter the control pipe pressure while the car is being brought to a stop.

When the operator again desires to start the car, he first releases the brakes by returning the brake valve handle 18a to its normal brake release position, thereby restoring the pressure of the control pipe 17 to atmospheric pressure. The differential relay 16 operates in response to the reduction of the pressure in the control pipe to effect the complete venting of pressure from the brake cylinders to thereby effect the complete release of the brakes.

When the pressure in the control pipe 17 reduces below five pounds per square inch, the contacts of the pressure operated switch 23 are snapped to open position, thereby disconnecting the battery 24 from the amplifier unit 27 and effecting deenergization of the magnet windings of all the contactors 31, 32 and 33 if all are not previously deenergized. In any case, the restoration of the contacts of the switch 23 to open position interrupts the circuit for energizing the magnet winding of the low magnet valve 41 which is the only magnet valve energized when the car is stopped with brakes applied, as just explained.

It will thus be seen that when the brakes are completely released, the consumption of current from the battery 24 by any of the equipment described is prevented. This includes the bulbs 75 of lamp devices 71, 72 and 73 which are automatically extinguished when the brakes are released.

It will be apparent that the degree of application of the brakes established, depends both upon the pressure established in the control pipe and upon the particular speed range in which the car travels. Thus if the application of the brakes is initiated while the car is traveling at fifty miles per hour, assuming a pressure of fifty pounds per square inch to be established in the control pipe, the maximum pressure initially established in the brake cylinders will be 80% of that in the control pipe or forty pounds. Similarly, if the application of the brakes is initiated at a time that the car is traveling at a speed of thirty-five miles per hour, assuming a fluid pressure of fifty pounds per square inch to be established in the control pipe, the maximum fluid pressure initially supplied to the brake cylinders will be 60% of that in the control pipe or thirty pounds per square inch. Likewise, if the application of the brakes is initiated when the car is traveling at a speed of fifteen miles per hour, assuming a pressure of fifty pounds per square inch to be established in the control pipe, the maximum fluid pressure initially supplied to the brake cylinders will be only 40% of that in the control pipe or twenty pounds.

In each case, the pressure in the brake cylinders is reduced automatically with reduction in car speed to the next lower speed range by operation of the differential relay until a brake cylinder pressure having the lowest ratio to the control pipe pressure is attained after which no further automatically effected change in brake cylinder pressure occurs.

If for some reason, the supply of current from the battery 24 fails during a brake application or before initiation of a brake application, the differential relay 16 is automatically conditioned to supply fluid to the brake cylinders at a pressure which is 60% of that established in the control pipe because the magnet windings of all of the magnet valves 41, 42 and 43 will then be deenergized. Assuming a sufficient pressure to be established in the control pipe, such as ninety pounds per square inch, 60% of such pressure or fifty-four pounds per square inch pressure in the brake cylinders will still provide an adequate degree of braking, notwithstanding the failure of the supply of current from the battery 24.

In the event of the failure of the supply of current from the battery 24, there will, of course, be no automatic graduated reduction in the degree of pressure in the brake cylinders with reducing car speed. In such case, however, the operator may reduce the pressure of the control pipe in steps to effect a desired reduction of the pressure in the brake cylinders.

*Summary*

Summarizing, it will be seen that I have disclosed a novel control device and apparatus for automatically controlling the degree of application of fluid pressure brakes of a railway car or train in accordance with the speed of the car or train.

The control device comprises essentially a plurality of radially-disposed angularly spaced light-sensitive tubes, a corresponding plurality of light sources for directing beams of light to impinge upon the light-sensitive tubes and a shutter which is rotatatively positioned in accordance with the speed of rotation of a wheel unit of the car to selectively permit the light beams to impinge upon the tubes or cut off the beams from the tubes in a plurality of different combinations.

It will be understood that while I have illustrated the control device comprising my invention in connection with a fluid pressure brake apparatus for a railway, such control device may be employed for other uses such as signaling or any other desired control operation.

Having now described my invention, what I claim as new and desire to secure by Letters Patent is:

1. A control device comprising a plurality of light-sensitive devices arranged in spaced circumferential relation, a plurality of sources of light each adapted to direct a beam of light on a corresponding one of said light-sensitive devices, a rotary shutter interposed between the light-sensitive devices and the light sources, said shutter having a plurality of concentrically arranged radially spaced arcuate perforations therein less in number than the number of light-sensitive devices through which to permit a beam of light to pass from a source of light to a corresponding light sensitive device only when the perforation is interposed between the source and the light-sensitive device, said perforations being so located that at least one of said perforations is effective in different rotative positions thereof to permit the passage of a beam of light therethrough from each of more than one of said sources to the corresponding light-sensitive device.

2. A control device comprising a plurality of light-sensitive devices arranged in spaced circumferential relation, a plurality of sources of light each of which is adapted to direct a beam of light on a corresponding one only of the light-sensitive devices, a shutter interposed between the light sensitive devices and the light sources and rotatively shiftable to a plurality of different positions, said shutter having a plurality of arcuate perforations therein through which to permit the passage of a beam of light from any one of said sources to its corresponding light sensitive device depending upon the position of the shutter, said perforations being of such nature and so located that in one position of the shutter all of the beams of light are cut off from the corresponding light-sensitive devices except that from one of said light sources to its corresponding light-sensitive device, that in another position of said shutter all of said light beams are cut off from the corresponding light-sensitive devices, that in a third position of said shutter all of said beams of light except that from a second one of said sources to the corresponding light sensitive device are cut off from the corresponding light-sensitive devices, and that in a fourth position of the shutter the beams of light from the said second of said light sources and a third of said light sources are permitted to impinge upon the corresponding light-sensitive devices and that of the said one light source is cut off from its corresponding light-sensitive device.

3. A control device comprising an annular casing open at both ends, a mounting bracket for said casing including an imperforate disk portion for closing one end of said annular casing and to which the casing is secured, said annular casing having a plurality of sockets located in circumferentially spaced relation on the interior thereof, a plurality of light-sensitive tubes mounted in said sockets in radially extending angularly spaced relation, a tubular shield enveloping each of said light-sensitive tubes secured to casing and having an opening therein whereby to permit the passage of a beam of light to the light sensitive tubes only through a restricted area, a cover adapted to be secured to said annular casing to close the open end opposite said mounting bracket, a plurality of lamp devices carried on the interior surface of said cover each of said lamp devices being so located as to direct a beam of light through the opening in the shield associated with a corresponding one of said light-sensitive tubes, and a rotary shutter rotatively carried by said cover and rotatable in a plane interposed between the light-senstive tubes and the lamp devices, said shutter having a plurality of arcuate perforations therein of such length and in such location as to selectively control the passage of a beam of light from the lamp devices to the corresponding light-sensitive tubes in a plurality of different combinations depending upon the rotative position of the shutter.

4. A combined control and indicating device comprising an annular casing open at both ends, a mounting bracket for said casing including an imperforate disk portion for closing one end of said annular casing and to which the casing is secured, said annular casing having a plurality of sockets located in circumferentially spaced relation on the interior thereof, a plurality of light-sensitive tubes mounted in said sockets in radially extending angularly spaced relation, a tubular shield enveloping each of said light-sensitive tubes secured to casing and having an opening therein whereby to permit the passage of a beam of light to the light sensitive tubes only through a restricted area, a cover adapted to be secured to said annular casing to close the open end opposite said mounting bracket, a plurality of lamp devices carried on the interior surface of said cover each of said lamp devices being so located as to direct a beam of light through the opening in the shield associated with a corresponding one of said light-sensitive tubes, a rotary shutter rotatively carried by said cover and rotatable in a plane interposed between the light-sensitive tubes and the lamp devices, said shutter having a plurality of arcuate perforations therein of such length and in such location as to selectively control the passage of a beam of light from the lamp devices to the corresponding light-sensitive tubes in a plurality of different combinations depending upon the rotative position of the shutter, an indicating scale carried on the outer face of said cover, and an indicating element carried by said shutter, said cover having a peripherally extending slot through which said indicating element extends into cooperating relation with said indicating scale on the exterior face of said cover whereby to indicate the rotative position of said shutter.

5. A control device adapted to be employed on a vehicle for controlling the degree of application of the brakes on the vehicle automatically in accordance with variations in the speed of the vehicle, said control device comprising a plurality of light-sensitive devices arranged in spaced circumferential relation, a plurality of sources of light each of which is so located as to direct a beam of light only on a corresponding one of said light-sensitive devices, and a rotary shutter interposed between the light sensitive devices and the light sources, said shutter having a plurality of arcuate perforations therein of a selected length and location so as to control the passage of the beams of light from said light sources to the corresponding light-sensitive devices in a plurality of different combinations depending upon the rotative position of the shutter, and means operative in response to the speed of the vehicle for rotatively displacing said shutter out of a given position corresponding to zero speed an amount substantially proportional to the speed of the vehicle.

6. Control apparatus comprising the combination of a light-sensitive device, a source of light adapted to direct a beam of light upon said light-sensitive device, a shutter having a perforation therein whereby to permit or prevent the passage of a beam of light from said source to said light-sensitive device selectively depending upon the position of the shutter, means for shifting said shutter to different positions, and a fluid pressure operated switch for controlling said light source in such manner that it is effective to provide a beam of light only when the fluid pressure supplied to operate said switch exceeds a certain critical pressure.

ELLIS E. HEWITT.